United States Patent
Darling, IV et al.

(10) Patent No.: US 7,448,223 B2
(45) Date of Patent: Nov. 11, 2008

(54) METHOD OF UNLOADING AND VAPORIZING NATURAL GAS

(75) Inventors: Charles M. Darling, IV, Houston, TX (US); A. Bruce Murray, Houston, TX (US)

(73) Assignee: DQ Holdings, LLC, Houston, TX (US)

( * ) Notice: Subject to any disclaimer, the term of this patent is extended or adjusted under 35 U.S.C. 154(b) by 541 days.

(21) Appl. No.: 11/240,627

(22) Filed: Oct. 3, 2005

(65) Prior Publication Data

US 2006/0076076 A1 Apr. 13, 2006

Related U.S. Application Data

(60) Provisional application No. 60/614,497, filed on Oct. 1, 2004.

(51) Int. Cl.
*F17C 13/00* (2006.01)
*F17C 9/02* (2006.01)
*F17C 1/00* (2006.01)
*F17C 13/08* (2006.01)
*B63B 22/02* (2006.01)
*B65G 5/00* (2006.01)

(52) U.S. Cl. ............... 62/50.7; 62/50.2; 62/53.1; 62/53.2; 141/82; 441/4; 405/53

(58) Field of Classification Search ............... 141/63, 141/70, 82, 382; 62/48.1, 53.1, 53.2, 50.1, 62/50.2, 50.6, 50.7; 441/3–5; 405/53
See application file for complete search history.

(56) References Cited

U.S. PATENT DOCUMENTS

| | | | | |
|---|---|---|---|---|
| 3,664,388 A | * | 5/1972 | Frankel | 141/284 |
| 3,700,014 A | * | 10/1972 | Scales et al. | 441/5 |
| 4,315,408 A | * | 2/1982 | Karl | 62/50.7 |
| 4,325,656 A | | 4/1982 | Bishop | |
| 4,499,844 A | * | 2/1985 | Parish | 114/367 |
| 4,501,525 A | * | 2/1985 | Grundy et al. | 141/279 |
| 5,025,860 A | * | 6/1991 | Mandrin | 62/48.2 |
| 5,129,759 A | | 7/1992 | Bishop | |
| 5,511,905 A | | 4/1996 | Bishop et al. | |
| 5,669,734 A | * | 9/1997 | Becnel et al. | 405/58 |
| 6,220,052 B1 | * | 4/2001 | Tate et al. | 62/613 |
| 6,517,286 B1 | * | 2/2003 | Latchem | 405/53 |
| 6,530,240 B1 | | 3/2003 | Kountz et al. | |

(Continued)

FOREIGN PATENT DOCUMENTS

GB 2399320 * 9/2004

*Primary Examiner*—Timothy L Maust
*Assistant Examiner*—Nicolas A Arnett
(74) *Attorney, Agent, or Firm*—Novak, Druce & Quigg LLP

(57) ABSTRACT

A method and apparatus for unloading natural gas (NG), including gasifying liquid and/or compressed NG using the latent heat of water and propane, and/or storing liquid or compressed NG gas in a storage cavern system that utilizes a buffer layer to prevent hydrating the NG gas, the storage cavern system being configured such that the NG may be forced out of a first storage chamber by increasing the amount of brine in a second chamber to displace a buffer fluid located therein such that the displace buffer fluid enters the first storage chamber and displaces the NG, as well as the processes for compressing, chilling and/or liquefying quantities of LNG and transporting those volumes to markets for redelivery.

44 Claims, 12 Drawing Sheets

U.S. PATENT DOCUMENTS

| | | | |
|---|---|---|---|
| 6,555,155 B2 | 4/2003 | Saxby et al. | |
| 6,581,618 B2 * | 6/2003 | Hill et al. | 62/260 |
| 6,584,781 B2 | 7/2003 | Bishop et al. | |
| 6,725,671 B2 | 4/2004 | Bishop | |
| 6,739,140 B2 | 5/2004 | Bishop et al. | |
| 6,813,893 B2 | 11/2004 | Bishop et al. | |
| 6,848,502 B2 | 2/2005 | Bishop et al. | |
| 6,880,348 B2 | 4/2005 | Bishop et al. | |
| 6,889,522 B2 * | 5/2005 | Prible et al. | 62/53.2 |
| 6,932,121 B1 * | 8/2005 | Shivers, III | 141/1 |
| 6,945,055 B2 | 9/2005 | Bishop et al. | |
| 6,973,948 B2 * | 12/2005 | Pollack et al. | 141/387 |
| 6,997,643 B2 * | 2/2006 | Wille et al. | 441/4 |
| 7,080,673 B2 * | 7/2006 | Pollack et al. | 141/82 |
| 7,147,021 B2 * | 12/2006 | Dupont et al. | 141/382 |
| 7,299,760 B2 * | 11/2007 | Boatman et al. | 441/3 |
| 7,322,387 B2 * | 1/2008 | Landry et al. | 141/382 |
| 7,360,367 B2 * | 4/2008 | Hubbard et al. | 62/50.2 |
| 2002/0174662 A1 * | 11/2002 | Frimm et al. | 62/50.2 |
| 2002/0174895 A1 * | 11/2002 | Hill et al. | 137/236.1 |
| 2003/0224674 A1 * | 12/2003 | Perera et al. | 441/4 |
| 2004/0059692 A1 * | 3/2004 | Hill et al. | 705/412 |
| 2004/0077234 A1 * | 4/2004 | Lavagna et al. | 441/4 |
| 2005/0061396 A1 * | 3/2005 | Landry et al. | 141/388 |
| 2006/0080973 A1 * | 4/2006 | Pollack et al. | 62/50.2 |
| 2006/0156744 A1 * | 7/2006 | Cusiter et al. | 62/53.2 |
| 2007/0128957 A1 * | 6/2007 | Korsgaard | 441/4 |
| 2008/0096448 A1 * | 4/2008 | Lokken et al. | 441/4 |

* cited by examiner

METHOD OF UNLOADING AND VAPORIZING NATURAL GAS

REFERENCE TO RELATED APPLICATIONS

This invention claims priority to U.S. Provisional Application No. 60/614,497, entitled "Method of Unloading and Vaporizing LNG" filed Oct. 1, 2004, which is specifically and entirely incorporated by reference

BACKGROUND OF THE INVENTION

1. Field of the Invention

This invention is directed to apparatus, systems, and methods for unloading, vaporizing, storing, and supplying natural gas in fluid form. The invention further relates to containers and transportation lines for carrying and transporting natural gas and other fluid forms.

2. Description of the Background

Current systems and methods for unloading and storing natural gas (NG) are both expensive and difficult to manage. When NG is transported in bulk, other than by pipeline, it typically is in liquid form, which requires extreme refrigeration for a reduction in temperature sufficient to form a liquid. When the liquid NG (LNG) arrives at a given destination, it is offloaded from transport tankers and stored onshore in specialized storage facilities while still in a liquid state. This unloading and land based storage of LNG causes difficulties that prohibit the proliferation of NG use in countries such as the United States.

At some point in the process of getting NG to the consumer, LNG is returned to a gaseous state. Even in the gaseous state, storage of LNG requires pressurized facilities, which presents both actual and perceived risks. Both types of risks stem from safety concerns, specifically catastrophic failure of the storage tanks, and under certain circumstances, followed by explosions and fire. Although current technology minimizes the risk of accidents, it cannot mitigate the risk of terrorism related failures. This fear has led many communities to refuse permission for the building of construction of unloading facilities and storage facilities.

Due to public safety concerns, stringent regulations are often put into place controlling when and where LNG tankers are permitted to dock. Other commercial and recreational boat traffic is often diverted when LNG tankers are present. This disruption to other businesses is a significant financial burden for every community in which there exists LNG traffic. Expenses related to offloading NG are already significant. Those expenses are significantly increased when considering all the safety precautions that must be taken into account.

One mechanism to address these concerns is disclosed in U.S. Pat. Nos. 4,325,656; 5,511,905; 6,530,240; 6,555,155; 6,584,781; 6,725,671; 6739,140; 6,813,893; 6,848,502; 6,880,348 and 6,945,055 (the disclosures of which are all hereby specifically incorporated by reference). These United States patents address concerns of LNG storage and propose storage of LNG in salt caverns. However, there are problems associated with thermal shock where the very cold NG hits the warmer cavern walls and creates unwanted and destructive fissures. Further, there is unwanted mixing of the LNG with seawater.

Onshore facilities built to store NG in a liquid state, and then to convert the LNG into gas at some later time is also extremely costly. New systems and methods for unloading and gasifying LNG without incurring the economically unreasonable costs are needed to enlarge the NG market domestically and abroad.

SUMMARY OF THE INVENTION

The invention overcomes the problems and disadvantages associated with current systems and methods of unloading and storing LNG.

One embodiment of the invention is directed to methods and apparatus for safely warming natural gas in a pipeline comprising passing the natural gas through a pipeline that is submerged in seawater, wherein the seawater is at a temperature which is warmer than the temperature of the natural gas. The seawater may warm the natural gas through forced or natural circulation. The pipeline is preferably constructed of a cryogenically qualified material, which is well known to those skilled in the art, and commercially available. Preferably, the pipeline is a jacketed pipe system that comprises an inner pipe filled with the natural gas, an outer pipe, filled with circulating a fluid buffer such as propane, a seawater exchange warmer, and a circulation pump. In this configuration, the jacketed pipe system may convert liquid natural gas to dense-phase natural gas between a berthing barge and a pumping platform, after the pumping platform, and/or between a pumping platform and a shoreline. Preferably the jacketed pipe system contains a monitor for detecting leakage of natural gas. The pipeline is preferably buried in or attached to the sea floor and enrooted to a shore side facility for distribution to customers.

The natural gas in this system may be warmed by a wrapped pipe system comprised of wrapping pipeline around a pumping platform, wherein the pipeline is warmed by seawater around the pumping platform. Further, the pipeline may comprises different stages of piping that gasifies the natural gas, such as, for example, a first stage comprising a jacketed pipe to carry the natural gas from a tanker or storage facility; a second stage comprising cryogenic piping; and a third stage comprising non-cryogenic piping. The different stages of piping are preferably sized such that they correspond to the calculated temperature of the natural gas at each position along the pipeline. Also preferably, the pipeline is insulated.

Another embodiment of the invention is directed to berthing facilities capable of docking a natural gas tanker internally or externally comprising a floating pumping platform; an optional surge tank; a pump or plurality of pumps;, an optional boil off compressor; a generator; piping; an unloading arm; insulated liners designed for both top and bottom fill; and an underwater natural gas storage facility. The berthing facility may comprise a series of pumps located on the tanker, on a pumping platform or on the berthing facility. Preferably the plurality of pumps are in parallel, and the piping is wrapped around the pumping platform to accommodate forced circulation and facilitate natural gas warming. Preferably the second floating platform houses dense phase equipment for the transfer of dense phase natural gas. Also preferably, the piping is buried in or on a sea floor enrooted to a shore-side facility.

The berthing facility may further comprise an underwater cavern as a natural gas storage facility, or a series of caverns or a depleted reservoir. Also preferably, the facility may comprising a safety system such as, for example, an emergency alarm and fire preventing and fighting systems, and/or an escape module.

Another embodiment of the invention is directed to methods and apparatus of offloading or storing liquid natural gas comprising offloading natural gas from a natural gas tanker into a first underwater cavern that contains a fluid buffer that forms between the natural gas and water in the cavern. Such methods and apparatus may further comprise a second cavern that contains the fluid buffer, wherein fluid buffer can be pumped from the second cavern into the first cavern as desired. Alternatively, or in addition, the fluid buffer is transferred into the second cavern as the first cavern is filled with natural gas. Also preferably, the fluid buffer is transferred from a pool into the second cavern thereby displacing a portion of the fluid buffer into the bottom of the first cavern thereby raising the pressure in the first cavern to a desired pressure level. In this system, the natural gas can be gasified during transfer into the first cavern, or upon commencement of offloading from the natural gas tanker.

Another embodiment of the invention is directed to methods and apparatus of storing natural gas in an underwater facility with dense phase equipment comprising: pumping the natural gas from a tanker into an underwater facility; interposing a fluid buffer between the natural gas and seawater to reduce a propensity of the seawater to mix with the natural gas; and periodically supplementing the fluid buffer with additional buffer to maintain the thickness of the buffer layer. Preferably the fluid buffer comprises propane, methane or a combination thereof. Further, the underwater facility can be formed such that a diameter around the bottom of the facility is reduced thereby reducing the surface area over which seawater can enter the natural gas and over which the fluid buffer can enter the natural gas. Preferably, the underwater facility is bottle shaped.

Another embodiment of the invention is directed to an underwater cavern containing: natural gas and water; and a fluid buffer between the natural gas and the water. Preferably the fluid buffer comprises propane, ethane or a combination thereof.

Another embodiment of the invention is directed to methods and apparatus of transferring natural gas into an underwater cavern comprising acclimating the cavern to about the temperature as the natural gas by repeatedly transferring heated natural gas into the cavern, wherein the natural gas is colder than the cavern, and each repeated transfer comprises natural gas that is colder than the previous transfer. Using these methods and apparatus, the natural gas is heated by transfer through pipes submerged in water, wherein the water is warmer than the natural gas.

Other embodiments and advantages of the invention are set forth in part in the description, which follows, and in part, may be obvious from this description, or may be learned from the practice of the invention.

DESCRIPTION OF THE INVENTION

Figure 1:
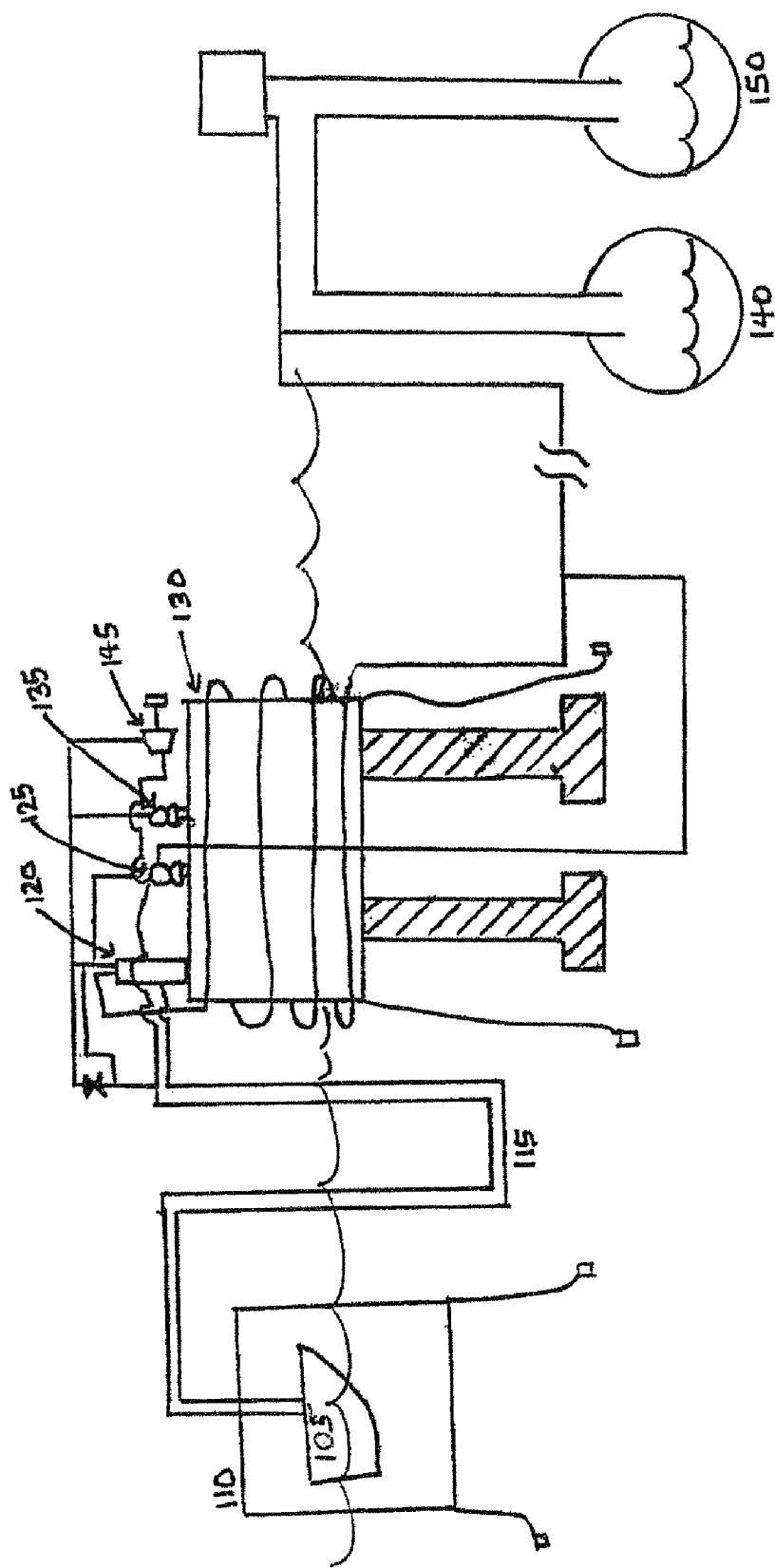
FIG. 1 shows an apparatus for unloading, gasifying, and storing LNG according to an embodiment of the invention.

Conventional methods for unloading and storing LNG are expensive and difficult to manage and adequately control. Processes such as loading and offloading in bulk, regasification and transportation are difficult to operate and operate efficiently. For example, LNG transported by marine tanker must be offloaded from transport tankers and stored onshore in specialized storage facilities in a liquid state. This unloading and land based storage of LNG causes difficulties that have impaired efficient utilization of LNG as a natural gas source in many countries. Storing LNG presents many risks including safety concerns, specifically catastrophic failure of the storage tanks and possible explosion. Current technology minimizes these risks, although they still exist as do risks of terrorism-related failures.

Systems and methods have been surprisingly discovered that substantially minimize these and other risks associated with natural gas. With the systems and methods of the invention, the natural risks associated with the handling of LNG are minimized as are the risks imposed from terrorism and unintended accidents. Further, the systems and methods of the invention are also highly efficient, taking advantage of available environmental conditions to create a cost-effective LNG management system.

The invention is directed to the transportation, loading and unloading of all forms of natural and petroleum gases including, but not limited to liquid natural gas (LNG), liquid petroleum gas (LPG), compressed natural gas (CNG), compressed petroleum gas (CPG), and also other gasses, such as, but not limited to helium and hydrogen. Natural gas comprises a mixture of low molecular weight hydrocarbons. A typical composition contains about 85% methane and about 10% ethane, with the balance composed of propane, butane and nitrogen. Petroleum gas (PG) comprises a large variety of low molecular weight hydrocarbons including propane, butane, hexane, pentane, and gasoline to name a few. Further, pure forms and other combinations of any of the components of natural gas and petroleum gas may also be used according to the invention. Although the invention is described using natural gas, the use of natural gas is exemplary only and PG, pure forms of the components of NG and PG as well as hydrogen and helium, and combinations of all of these gasses, are equally applicable to the systems and methods of the invention.

The invention also applies to both the liquid and gaseous forms of natural gas. Liquid, as used herein, refers to the form of a substance between a solid and a gas. The form or state of a substance is determined by both the temperature and pressures at which the substance is maintained. Many gasses may exist in a state of dense-phase. Dense phase gas has the attributes of a gas, meaning that it must be maintained under pressure, but is sufficiently dense so as to have the physical characteristics to act as a liquid. Dense gasses are gasses at very cold temperatures, usually less than 0° C., preferably less than minus 50° C., more preferably less than minus 100° C., and even more preferably less than minus 150° C.

In particular, the invention is directed to transporting and storing LNG as well as CNG. The transportation of CNG, as compared to LNG, has the potential to allow non-pipeline transportation of NG on far more economic terms, reducing the huge infrastructure costs of an LNG project and making its utilization more economic. In such instances, a CNG infrastructure would be significantly more cost-effective than an LNG project. CNG eliminates the cost of $CO_2$ removal, liquefaction and the need for extreme reductions in temperature and the corresponding maintenance, while being capable of holding significant volumes of natural gas on one tanker. Bulk transport of NG occurs now in one, two and three billion cubic feet quantities. Although CNG presently requires more space, the additional space requirement needed is sufficiently offset by the saving achieved in time, energy and cost.

Costs can additionally be reduced by using light weight composite or composite wrapped steel tanks of small to large dimensions. The use of composite wrapped tanks or composite filament wound tank reduces the need for thick steel tank walls, which reduces the weight needed for containment and transportation of CNG. By utilizing one variety of hoop wrapping composites to carry CNG, the production costs for such containers will be less costly because production tooling can be used that is also used for regular all-steel storage tanks. Hoop wrapped composite cylinders also offer increased safety levels, as the lighter steel liner has the strength of steel and the additional strength of diagonally-wrapped tightly woven composite fibers which are durable and tolerant to stress damage. The attainable volumetric ratio for CNG, even if less than the volumetric ratio for LNG, can be maximized by optimizing the temperature and pressure to benefit from the effect of super compressibility, which increases the attainable volumetric ratio.

The cylinder liner may be steel, aluminum or other suitable material that retains its strength at the lowest transportation temperatures to be maintained during transportation or during unloading of the CNG. The composite wrapping or filaments may comprise carbon such as graphite, or fiber glass, with a bonding material of epoxy or other resin. Examples of suitable resins include, but are not limited to esters, rubbers, high-strength man-made polymers, petroleum-derived resins, and combinations thereof. A complete composite may eliminate the liner. The shape may be spherical, but is preferably cylindrical with closed, but protruding ends to minimize or eliminate the presence of any sharp angles to the overall structure. Containers may be vertical or horizontal, but in either formation will comprise groups of interconnected containers to facilitate loading and unloading either simultaneously or sequentially.

As embodied and broadly described herein, the present invention is directed to systems and methods, and also specific apparatus, for unloading and vaporizing LNG, as well as the processes for compressing, chilling and/or liquefying quantities of LNG and transporting those volumes to markets for redelivery. An exemplary embodiment of the invention comprises an offshore berthing facility at which LNG tankers may be docked and unloaded, a series of pumps to offload the LNG from the tanker, temporary storage tankage to store the LNG, and a gasifying apparatus to gasify the LNG, which regasifies the LNG into a commonly usable form. Once in a usable form, the NG can flow into the existing infrastructure to transport the gas to market. Alternatively, gasification can be more transitory, allowing efficient transportation and storage, with subsequent regasification and transportation to market.

One advantage of the invention is the use of offshore berthing facilities to provide docking for NG tankers. This minimizes public concern over accidents, and the reality attributed to safety measures that must be taken against real accidents and possible terrorism. Public concerns are alleviated, in significant part, because the NG is far enough from shore so that even a catastrophic failure would not pose a danger to the local populace or structures. While a concern still exists for the safety of the tankers' crew members and the crew of the berthing facility safety precautions can be incorporated into the design of the berthing facility for a fraction of the cost of similar safety systems at an on-shore facility. For example, safety escape pods can be positioned in easily accessible locations for use during an emergency situation. The escape pods may be manually or automatically driven to a distance safe from explosion or fire.

Offshore berthing facilities are also beneficial in that they do not require a large area of waterfront real estate, thereby removing the costs associated with purchasing waterfront real estate and the interference they pose to other commercial and recreational traffic. Offshore facilities are also more flexible in that they are less affected by inclement weather than shore facilities.

While it is preferred that the berthing facility is offshore, the invention is not limited to offshore berthing facilities. For example, berthing facilities may be located along the shore, in inland waterways, or even in man-made waterways. The facilities can accommodate tankers carrying chemical cargo of any nature. Preferably the cargo is natural gas, but can also be any hydrocarbon liquid other than NG, such as ethane, propane, butane or even heavier hydrocarbons.

Once a tanker is docked at the berthing facility, LNG may either be regasified at the berthing facility or transferred to a short term storage tankage. In the latter circumstance, LNG is transferred to an NG storage facility. If not converted on the berthing facility, the LNG can either be regasified by using the heat of the intervening seawater between the berthing facility and the host platform or transferred to an NG tank on the host platform for storage. Using seawater to warm the NG results in considerable savings in time, cost and equipment. In one embodiment, a jacketed pipe system employing a warming fluid may be used to gasify the LNG. Such a jacketed system provides an advantage in that it would be designed to local conditions in such a manner as to prevent unacceptable ice buildup and unwanted flotation tendencies as called for by process designers. In a preferred embodiment, this jacketed system fluid contains propane, which does not freeze at LNG temperatures. In a further embodiment, the jacketed system also serves as a safety system such that an NG leak will cause an over-pressure relief system to provide a signal for NG shutoff. This jacketed system can be used, for example, for regasification between the berthing barge and the host platform, or after transfer of the LNG to the host platform.

Once the LNG is regasified, transportation facilities, whether existing or new, can be utilized to transport the gas to market. Preferred embodiments use onshore or offshore salt caverns or depleted gas reservoirs as LNG gas storage facilities.

Docking of NG Tanker Ships

In one preferred embodiment, an NG tanker docks at an offshore berthing facility or berthing barge, transfers NG through a pipeline system to a pumping platform equipped with tankage and ancillary equipment for pumping the NG and thereafter introducing the NG to a piping system designed to vaporize the NG while en route to shore for usage or storage. Preferred embodiments of the invention use free floating berthing facilities. These facilities are flexibly moored such that they rise and fall with the tide and rise and fall with the docked tankers. In one such embodiment, the NG tankers are preferably externally secured to the facility, allowing for fast docking and departing of the NG tankers. The offshore berthing facility may have a wet dock that allows NG tankers to dock inside the berthing facility and be secured therein, such that the NG tankers rise or fall due to ocean movement along with, or even inside, the facility. In one such embodiment, the berthing facility preferably secures the NG tanker in place by closing a lock behind the tanker.

The berthing barge is designed for use with various size tankers in either seawater, brackish or fresh water. It can be anchored or tethered so as to maintain lateral position, can be dynamically positioned to maintain lateral position, can be free to float in a fixed matrix designed to restrict lateral movement and thereby maintain lateral position, can be moored to a fixed platform to maintain lateral position, but with break away capability in the event of operational need or emergency. Additionally, the barge is designed for either self propulsion or arranged for towing.

In preferred embodiments, the berthing barge accepts vessels that are either mid ship, bow or stem cargo discharge. The berthing barge is also preferably arranged with multiple platforms suitable for handling cargo discharge and taking on required supplies. The berthing barge can be arranged to receive service vessels or helicopters. Embodiments include the berthing barge is arranged to receive such items as NG vapor return or nitrogen gas in the case of NG cargo handling, as well as to receive ships stores, fuel oil, electrical service and communication service for NG or other cargo handling. Preferred embodiments advantageously have a berthing barge designed to contain NG or other spills and properly dispose of them with due regard to safety and environmental concerns. The barge can be designed with safe operating and control rooms and/or facilities, with safety systems triggered either automatically or manually which have the capability to shield personnel from heat or dangerous atmospheres and to extinguish fires using dry powder and/or fire water systems.

In an alternate embodiment of the invention, the offshore berthing facility is firmly connected to the ocean floor or another non-floating object that itself may be secured to the ocean or sea floor, or other solid feature of the body of water, to provide a secure and stable platform for the docking of tankers. In preferred embodiments of the invention, NG tankers may be docked within the berthing facility or external to the berthing facility. Ships stores and nitrogen may be provided on the berthing facility or the pumping platform to re-supply NG tankers as required.

Figure 2:
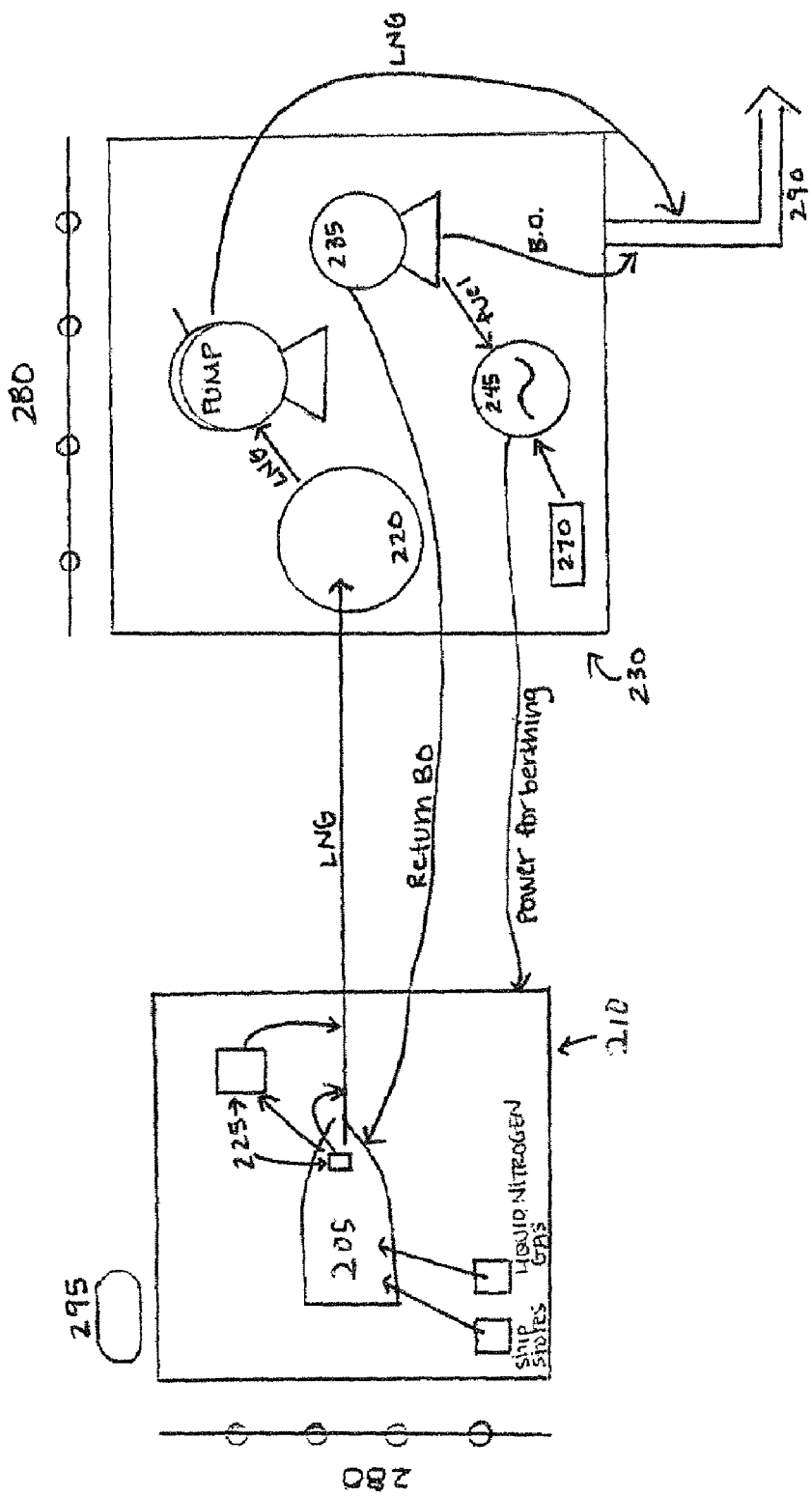
FIG. 2 shows an overhead view of a berthing facility and a pumping platform according to an embodiment of the invention.

As depicted in FIGS. 1 and 2, in one embodiment, berthing facility 110, 210 is designed to receive several sizes of commercial LNG transport vessel 105, 205 and rise and fall with the tide and waver to minimize unloading arm design problems. The vessels can be received either internally or externally by the berthing, and may be arranged to "break-away" and go to sea in case of emergency or berthed in to become a unitary piece. In additional preferred embodiments, the unloading arm connection for the berthing facility is arranged to accommodate vessel unloading systems of various designs, such as mid-ship-side unloading or low and/or stem unloading, depending on vessels berthed at the berthing facility.

Off Loading of NG

On-board NG ship pumps may be utilized to move the NG cargo through underside insulated liners 115 to the platform 130, 230 for introduction into NG surge tankage 120, 220 designed for both top and bottom fill to minimize the tendency to "roll-over" and thereby will not overstress the surge tankage. Tanks may be of low profile design to Minimize wind forces on the structure.

Once an NG tanker is docked, at the berthing facility, the tanker and the facility may be functionally connected such that the NG may be unloaded from the tanker (see FIG. 2). In one embodiment of the invention, a series of pumps 225 are located on tanker 205 to transfer the NG. In another embodiment, the pumps 125 are located on pumping platform 130 to transfer the NG. In yet another embodiment, a series of pumps are located on the berthing facility to transfer the NG. Although the term "platform" is used here, it is not intended to define or limit the possible structure of the pumping structure to a platform design or any particular structure. Many variations of structures including conventional structures are contemplated.

While it is preferred that multiple pumps are available to transfer NG, a single pump or other means of transferring the NG may be used. A preferred embodiment uses a parallel array of pumps to pump liquid NG from the tanker. By using multiple pumps, the rate of NG transfer can be adjusted. The pumping platform may be equipped with NG tanks sufficiently large to span the ship arrival times while continuing to pump NG to minimize the thermal cycling stresses in the NG piping vaporizing and warm-up system. Pumps may be arranged to pump in parallel so as to accommodate either fast or slow pumping by adding or removing pumps from the active pumping configuration. Pumps may also be "in-tank" or external as preferred by the process designer.

Boil-off compressor 135, 235 and associated piping may be provided to return boil off (BO) to LNG tanker 105, 205 during unloading, to provide fuel gas for turbines or compressors, and/or to introduce boil-off gas into the high pressure LNG/gas pipeline 290 (see FIG. 2). An electrical generating system arranged with distributive switchgear and wiring may be resident on the pumping platform, and may be designed to use boil-off as primary fuel but may also operate as a standby fuel source 270. The generating system 145, 245 may be arranged to provide service to the berthing facility through an undersea system.

The berthing facility is preferably configured so as to be capable of connecting to other offshore facilities for handling offloaded NG with concomitant vapor return, as well as receiving $LN_2$ (liquid nitrogen), fuel oil, electric power, communications, and ships stores. Service vessel docking and receiving are also incorporated into the facility design. The docking facilities are preferably designed for safe quick release of docked tankers or service vessels in the event of an emergency. The design of the facility may be such that it is capable of remaining at sea during all conceivable weather conditions. As shown in FIG. 2, emergency alarm and fire preventing and fighting systems 280 may be resident on the facility. Such systems may include dry powder and seawater systems. Escape modules 295 may be provided for operating personnel. Materials of construction for the facility may be selected so as to mitigate the danger of spilled cryogenic fluids.

The invention also comprises an unloading arm on the berthing facility to functionally connect the tanker with the berthing facility. The unloading arm is designed to provide a pathway for the transfer of LNG regardless of movement of the tanker relative to the berthing facility. This arm may comprise a swivel connector for mid-ship unloading, bow unloading, and/or stem unloading.

NG Storage after Offloading

Temporary storage tankage can be provided on the berthing facility such that NG is transferred from a tanker to the storage tankage on the berthing facility. Temporary storage is storage that is intermediate between offloading and transfer to a gasification facility. In another embodiment, similar storage tankage may be located on a pumping platform, or located on both the berthing facility and the pumping platform. The term "tankage" is used to indicate that various embodiments of the invention may use different arrangements and types of tanks to store the LNG.

In one embodiment, high pressure gas is directed into at least one prepared salt cavern 140, 150 for use at a later time. There are several disadvantages associated with the storage of NG gas in salt caverns. Initially, when the salt caverns are hollowed out, rock and other non-soluble materials that were trapped in the solid salt are freed. These solids settle to the bottom of the cavern where they trap water. When gases are stored in the caverns, the water evaporates into the gas thereby hydrating the gas. When the hydrated gas is extracted from the cavern, it must be dehydrated, a process involving expensive equipment.

Caverns for storing natural gas may be constructed by drilling a well into a salt diapir, anticline, dome or other structure, pumping fresh water into the well to dissolve the salt, and then disposing of the resulting salt water. The cavern shape is controlled by directing fresh water to the portion of the salt designated for removal. Most of the salt structures contain insoluble substances such as anhydrites or hydrates which cannot be removed with the brine and therefore fall to the bottom of the resulting cavern. The insoluble rubble is undesirable because it makes it very difficult to remove all of the salt water from the cavern.

When such a cavern is utilized as a gas storage container the gas comes into direct contact with the residual water and absorbs some of the water. Depending on the circulating rate of the gas, the gas may absorb a quantity of water such that expensive dehydration is required prior to introducing the gas into a pipeline system. This gas circulation rate is a function of several forces such as the rate of gas injection, the location of gas injection, and the thermal influx from the salt.

Before LNG can be introduced into a cavern at a rate for maximum efficiency, the cavern must be cooled significantly either by injection of liquids or gases. If the integrity of the reservoir is not maintained, the difference in temperatures will result in thermal shock of the cavern atmosphere causing the cavern walls to crack. In a preferred embodiment, LNG is pumped off the tanker and significantly warmed via a wrapped pipeline and seawater circulation. The warmed LNG is then pumped into the cavern and back out again before passing through a heater and compressor and distributed for sale. With each exchange of LNG passing through the salt cavern, the temperature in the salt cavern decreases and the cavern can increasingly withstand colder LNG introduced until a maximum rate of LNG can be injected.

In a preferred embodiment of the invention, a layer of propane may be interposed as a buffer layer between the gas and the water to reduce the propensity of the water to go into the gas mixture. A buffer layer, or rubble seal, is effective, because the sub cooled liquid propane blanket is less dense than the water, or brine, in the bottom of the cavern and denser than the regasified NG. By covering the rubble and the water with the propane blanket, the amount of hydration that occurs in the stored NG gas is minimal. Such a buffer may greatly reduce the water content of NG exiting a salt storage cavern, thereby greatly reducing, or even eliminating, the need for expensive gas dehydration that would otherwise be necessary to meet marketing specifications for gas.

Chemicals that can be used as the buffer layer at least has a specific gravity that is greater than NG but less than water. Preferably, the chemical used is not miscible or only slightly miscible in water or NG. However, so long as the miscibility does not interfere with downstream use of the NG, more miscibility may be tolerated, which will require replenishment of the pad. Replenishment may be constantly provided or periodic (e.g., daily, weekly, monthly or longer) through appropriate pipes and channeling apparatus, which can be constructed by those of ordinary skill in the art. The periodicity of replenishment will depend on a combination of factors including miscibility of the substance with the NG or with the water, NG temperature, water temperature, cavern temperature, depth of the cavern, the overall structure and contours of the cavern, and the presence and amount of rubble. The buffer layer or pad needs to be sufficiently thick to prevent mixing of the NG and water, brine, rubble and other materials at the bottom of the cavern. A suitable pad is from about 15 cm to about 10 meters in thickness, preferably from about ½ meter to about 10 meters thick, and more preferably from about 1 to about 5 meters thick. Substances that can be used as the pad include, but are not limited to ethane, methane, propane, carbon dioxide, liquid nitrogen and combinations thereof. Chemicals to control unwanted side effects attributed to the substances such as buffers, thickeners, acids and alkalines may also be included as necessary or desired.

Volumes of LNG may be introduced into the gas storage reservoirs. Prior to or simultaneous with such introduction, a layer of liquefied propane or similar fluid provides a buffer layer that prevents the intermingling of the LNG with the salt water and/or rubble at the base of the reservoir. In this embodiment, the LNG is directly injected into the cavern, which has already been chilled through injection of increasingly cold gases and thereafter, liquids until the LNG can be introduced with minimal thermal shock. Once in place, through circulation incidental to injection of new volumes and warming effected through thermal interaction at the subterraneous levels, gasification can be commenced in situ with further gasification.

The propane buffer seal may be gradually consumed commingling with the gas. Propane may be periodically added to the buffer seal to maintain the depth of the buffer fluid in a preferred range. Fluids other than propane may be used to form the buffer layer, such as a mixture of ethane and heavier hydrocarbons.

The cavern shape may be controlled and changed as desired using conventional equipment and engineering techniques. In a preferred embodiment, the bottom of the cavern may be formed such that the diameter is reduced. By reducing the diameter of the bottom of the cavern, the surface area over which the water may be absorbed by the gas is also reduced, and in embodiments using a buffer layer as described above, the water and the buffer layer, and the buffer layer and the gas are also reduced. By reducing the surface area over which the water can enter the propane and over which the propane can enter the gas, the need for dehydration and buffer maintenance are reduced. In a preferred embodiment, the insoluble materials are isolated by careful shaping of the bottom of the cavern. A total seal is created by forming a bottle shape at the bottom of the cavern.

After the insoluble rubble had fallen below the bottle neck, the lower plastic salt may completely seal the neck. When storing NG in a salt cavern, the internal pressure of the cavern needs to be considered. There is a maximum safe pressure to which a salt cavern used to store natural gas may be pressurized. The internal cavern pressure is affected by conditions such as the cavern salt temperature, the physical shape of the cavern, the physical and chemical composition of the salt and the nature, depth and density of the overburden (soil or sand) above the salt structure in which the cavern exists. If a cavern is filled with gas at a temperature lower than the temperature of the salt, the gas will be warmed and the pressure will rise. If the pressure rises above a safe level, the integrity of the storage cavern may be threatened. To lower the pressure, gas withdrawal from the cavern may be initiated or if it is already being withdrawn, the rate of withdrawal may be increased. The pressure in a cavern may be lowered, allowing for the temporary storage of a greater volume of gas by gradually allowing LNG to enter the cavern, thereby reducing LNG tanker unloading time. The effectiveness of this technique, in part, depends on the proximity of the cavern to an LNG dense phase warming system, and whether the storage cavern, is utilized for in situ gasification.

NG Storage Tanks

NG is stored in containers during shipment, after offloading in land or water, and at various points during transportation to the customers. The design and structure of these containers is well known to those skilled in the art. Typical shipping containers are spherical, preferably cylindrical, and contain approximately one million cubic feet of LNG. Ocean going ships carry from one to four of these containers, preferably three. Because the LNG in such instances is a liquid, no pressurization is required. However, containers must withstand temperatures down to −240° C. Typical containers are composed of a nickel-steel alloy.

CNG is also transported in containers, but because the NG is compressed, pressurization is required. Pressurization may be from 500 to 5,000 psig, preferably from 1,000 to 4,000 psig, more preferably from 2,000 to 3,000 psig, and most preferably from 1,400 to 3,600 psig. Container design is preferably a cylinder with rounded ends for maximum structural integrity. Cylinder size ranges from 1-6 feet in diameter, and from 20 to 400 feet long. Cylinder widths and lengths may be larger or smaller depending mostly on manufacturing and transportation needs and requirements.

Preferably cylinders are composed of a light-weight material that is relatively unaffected by cold temperatures and expected pressures. Temperature of CNG range from −100° C. to 30° C., and is preferably from −80° C. to −20° C., and more preferably about −40° C. A material that adequately withstands such temperatures and also expected pressures includes, but is not limited to, steel, fiberglass, graphite, plastics, carbon fibers and combinations there. Containers may have a steel, aluminum or glass fiber lining, but an inner lining is preferably not required. More preferred is steel, which has a high ductile fracture mode and a low brittle fracture mode. Also preferred is carbon fiber/binder wrapped containers using binders such as, but not limited to epoxies such as polyacrylonitrile (PAN), resins such as polyesters and combinations thereof. Carbon fibers that are both strong and light weight, as compared to steel, include, but are not limited to graphite, carbon composites, codified solid fibers, laminated carbon fibers, PAN-based carbon fibers, pitch-based carbon fibers and combinations thereof.

Container sizes for CNG preferably hold from 1 million cubic feet to 1 billion cubic feet of NG. The more compressed the NG, the greater strength required against expansion of the container. The colder the CNG, the greater resistance required against brittle fracture. More preferred sizes are dictated by the requirements of the particular transportation vessel (e.g. ship), or storage facility size at which they are maintained.

Regasification

Once the LNG is unloaded from the tanker, it can be stored as is, or gasified prior to short-term (e.g. days to weeks) or long-term (e.g. weeks to months to years) storage. The LNG can be regasified at any point prior to reaching either an LNG or a gas storage facility. Examples include, but are not limited to, gasification during offloading if no LNG storage tankage is utilized, during transfer from the LNG storage tankage to an offshore NG storage facility, or during transfer from LNG storage tankage to a land based storage facility. The regasification of the LNG can begin immediately upon commencement of unloading from the tanker. Also, the regasified NG does not need to be transferred to a gaseous storage facility. The gaseous NG may be shipped to other offshore facilities, vessels, or locations, or even fed into existing gas pipelines as detailed later. For clarity of explanation, the majority of examples described herein will involve transferring the gaseous NG to a storage facility.

Liquid NG is gasified by a vaporization system that may have any one or more of several configurations which may be submerged to make use of the warming capability of seawater. To gasify NG, liquid NG is pumped to an elevated pressure and is preferably introduced to a pipe or multiplicity of pipes, which may be non-insulated, insulated, or partially insulated, and may be configured to accommodate either natural or forced seawater circulation to facilitate warming at a desired rate.

Figure 3:
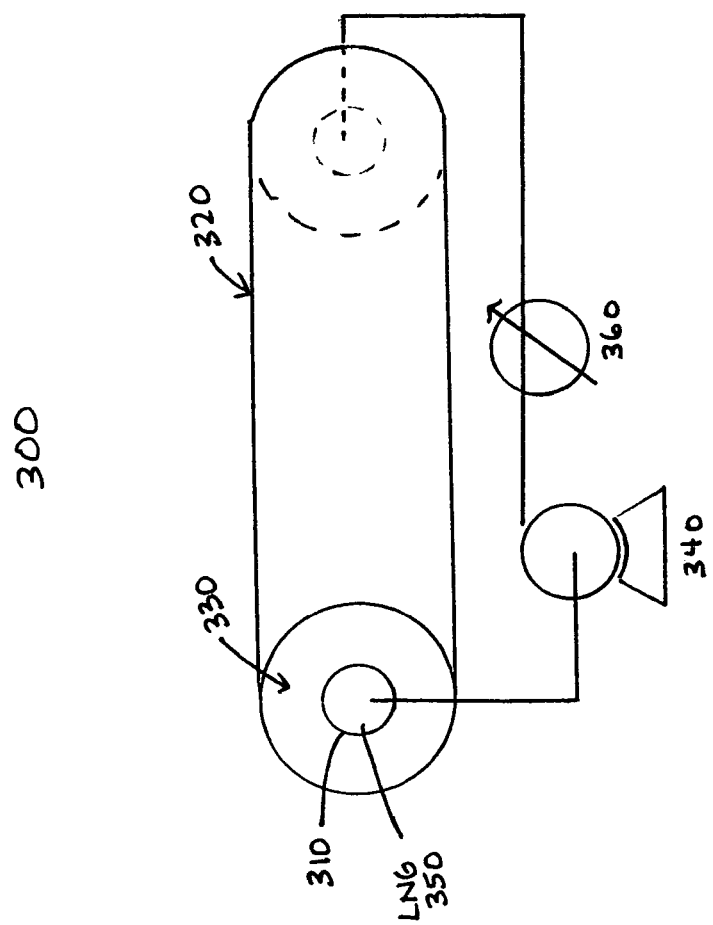
FIG. 3 shows a tube-in-tube gasification system according to an embodiment of the invention.

One preferred embodiment of the invention utilizes a jacketed pipe system similar to a tube-in-tube heat exchanger 300 (see FIG. 3). In this embodiment, liquid NG is transported through an inner pipe 310 that is surrounded by an outer pipe 320, which may extend the entire length of the piping, partway, or in segments. The outer pipe is preferably filled with circulating liquid propane 330. A propane pump 340 pumps the liquid propane through the outer pipe 320 to warm the NG (in the inner pipe) 350. Ambient seawater pumped through a seawater exchange warmer 360 is used to warm the propane 330. An advantage of this embodiment is that the propane does not freeze at the temperature of the NG, and the propane can be circulated at a rate such that seawater does not freeze on the exterior of the piping, thereby causing buoyancy problems. An additional advantage is that if the inner pipe fails, the outer pipe will experience an overpressure situation which can be detected and used to produce a signal to stop the flow of the NG.

In an alternate embodiment of the invention, the piping is "wrapped" around the pumping platform supporting structure in a coiled spiral configuration to accommodate forced circulation (see FIG. 1). One or more coils or turns of piping are located underneath the seawater for heating of the NG inside the piping system. Preferably, at least 3 coils are located underwater, more preferably at least 4 coils are located underwater so that seawater may be forced over piping carrying NG. A benefit of forcing seawater over the piping is that it prevents ice from forming on the outside of the piping. Forcing circulation of the seawater may also prevent pockets of cold water from forming around the piping. Such pockets would prevent efficient heating of the NG. By wrapping the piping around the structure, a minimal number of water movers, such as large underwater turbines, are needed to force seawater over a significant portion of the piping system. In further embodiments, the path of the piping may be changed to maximize the warming capacity of the seawater.

In an alternate embodiment, the piping system is buried in the sea floor enrooted to shore side facilities. Further embodiments may utilize insulation and anti-buoyancy systems to prevent ice-build up and unwanted buoyancy problems. NG can be safely vaporized, gasified, and warmed to normal pipeline temperature in a single carrier pipe submerged in seawater, with appropriate cryogenically qualified piping to carry the NG during the regasification process during the course of transportation.

In a further embodiment of the invention, a system utilizing different stages of piping is used to regasify the LNG. In this embodiment a first stage uses a jacketed pipe to carry the LNG from the tanker or storage facility, a second stage uses cryogenic piping, and a third stage uses standard piping. The different stages of piping are sized such that they correspond to the calculated temperature of the NG at each position in the regasification process. By matching the appropriate type of piping with the temperature of the NG, the system is robust enough to withstand the necessary temperature differences between the NG and the heat source (e.g. seawater), while having the most efficient heat transfer properties allowable.

NG can be safely vaporized, gasified, and warmed to normal pipeline temperature in a multiplicity of pipes submerged in seawater. Natural or forced seawater circulation is used as a heat source. Insulation can also be used to moderate the heat transfer characteristics of the applied heat source. The pumping rate of the NG and/or the jacket fluid is used to moderate the heat transfer characteristics of the applied heat source. The warming fluid in the jacketing system, which is preferably propane, is warmed to an appropriate temperature for circulation by an exchange with seawater. Liquids other than propane that have appropriate chemical and physical properties such that they do not freeze at temperatures or harm the jacketing on safety system are used as the warming fluid in the jacketed system. Warming is used to control system buoyancy and the jacketed system is used as a leak monitor for the NG vaporizing system.

In a further embodiment, a pumping system is employed to force the circulation of seawater to control NG vaporizing/warming as well as control buoyancy, which is much more environmentally friendly than a heating system. Once the NG is regasified, it may be stored or it may be transported. Onshore storage systems are used to mitigate the flow quantities required to steadily supply the gas market regardless of flow variations from the offshore system operating parameters. Alternatively, an NG storage facility may be incorporated to store the regasified NG.

In a further embodiment, after cooling of a salt cavern and the introduction of a barrier to the bottom rubble and salt water, the LNG is introduced directly into the salt cavern, circulating out in the process the cooling medium utilized to minimize the thermal shock associated with the introduction of the LNG directly into the storage cavern, where gasification and redelivery can begin. The storage cavern would have warming devices included in the cavern to circulate a warming medium to regasify the LNG for redelivery to traditional transportation systems.

The following examples illustrate embodiments of the invention, but should not be viewed as limiting the scope of the invention.

EXAMPLES

Figure 5:
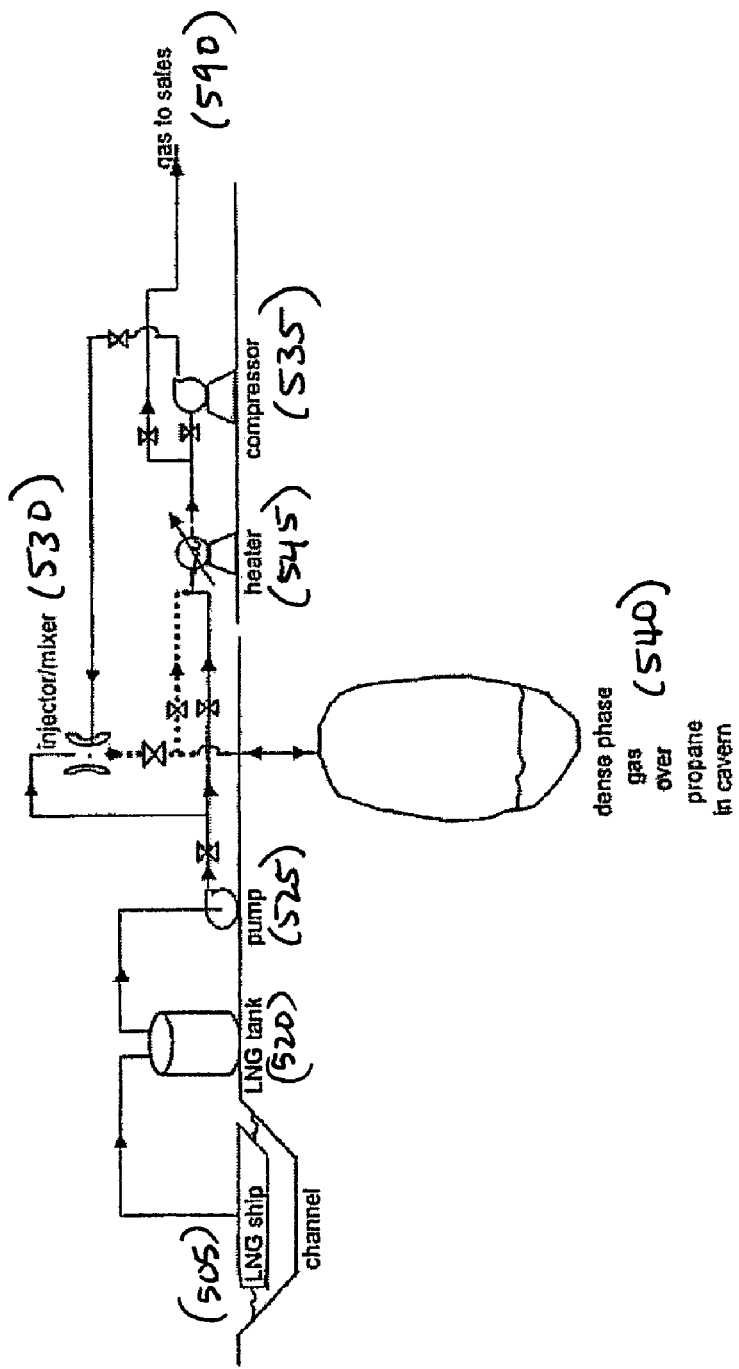
FIG. 5 shows an apparatus for unloading, gasifying, and storing LNG wherein a storage cavern is subjected to temperature control to control cavern pressure according to an embodiment of the invention.
Figure 6:
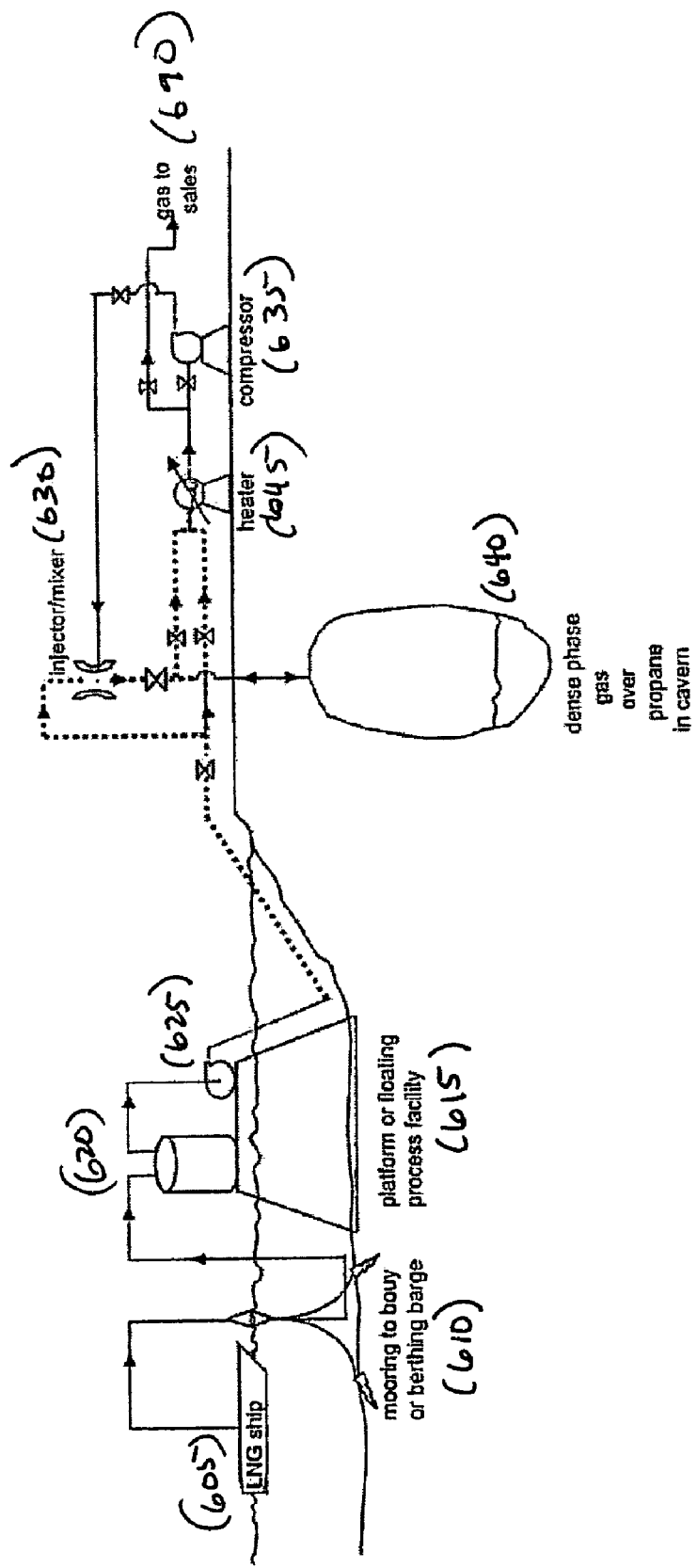
FIG. 6 shows an apparatus for unloading, gasifying, and storing LNG using an offshore mooring and platform, and an onshore storage cavern according to an embodiment of the invention.

FIGS. 5 and 6 depict the use of dense phase equipment. In FIG. 5, NG is pumped from an offshore docked tanker 505 to a temporary NG tank 520 on shore. From the temporary tank, NG is pumped via pump 525 into an underwater cavern 540. A layer of propane is interposed by an injector/mixer 530 into the cavern as a buffer layer between the gas and the water to reduce the propensity of the water to go into the gas mixture. When desired, the NG is pumped out of the cavern, vaporized by a heater 545, and then distributed for sale through a pipeline system 590. The heater 545 and compressor 535 are optionally included for further compression. Preferably, onshore storage systems are used to mitigate the flow quantities required to steadily supply the gas market regardless of flow variations from the offshore system operating parameters.

Preferably the gas stored in the salt cavern is natural gas, but may be any other gas. A method and/or apparatus can be used to force gas out of the cavern by pushing propane from a second cavern with the driving force being salt water forced into second cavern. More preferably, the need for dehydration on removal of the gas from the storage cavern is mitigated by employing a propane water seal over the top of the water filled rubble (such as anhydrites) which exists in the cavern bottom.

In FIG. 6, this preferred embodiment depicts an offshore mooring 610 to the buoy berthing barge for docking and unloading of the NG tanker 605. The NG is pumped onto a platform or floating process facility 615 into a temporary tankage 620. Pump 625 then transfers the NG through an insulated/uninsulated line to shore and into underwater cavern 640. An injector/mixer 630 introduces the propane layer into the cavern as a rubber seal or buffer layer. When desired, the NG is pumped out of the onshore underwater cavern 640 and then distributed for sale through a pipeline system 690. Optionally, the NG may pass through a heater 645 and compressor 635 before distribution.

Figure 7:
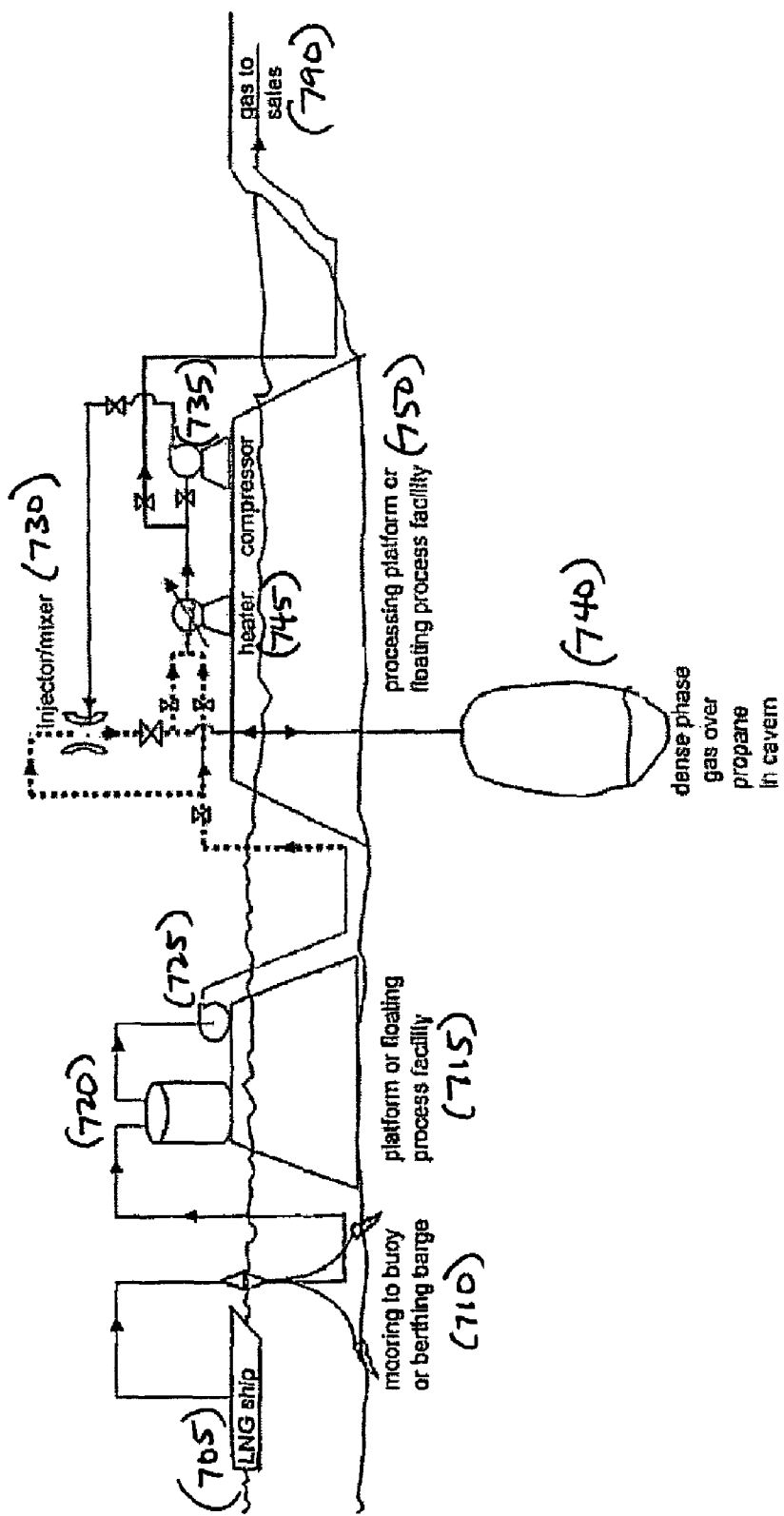
FIG. 7 shows an apparatus for unloading, gasifying, and storing LNG using an offshore storage cavern with a separate surge tank according to an embodiment of the invention.

FIG. 7 shows the use of an offshore cavern. The NG tanker 705 is moored to buoy or berthing barge 710 while the NG is offloaded through insulated pipes to a temporary tankage 720 on a platform or floating process facility 715. A pump 725 on the platform transfers the NG via uninsulated pipelines onto another processing platform or floating process facility 750 with the dense phase equipment 730. The NG is stored in an underwater salt cavern 740 utilizing dense phase technology. When desired, the NG is pumped out of the offshore underwater cavern 740 and then distributed for sale through a pipeline system 790. Optionally, the NG may pass through a heater 745 and compressor 735 before distribution.

Figure 9:
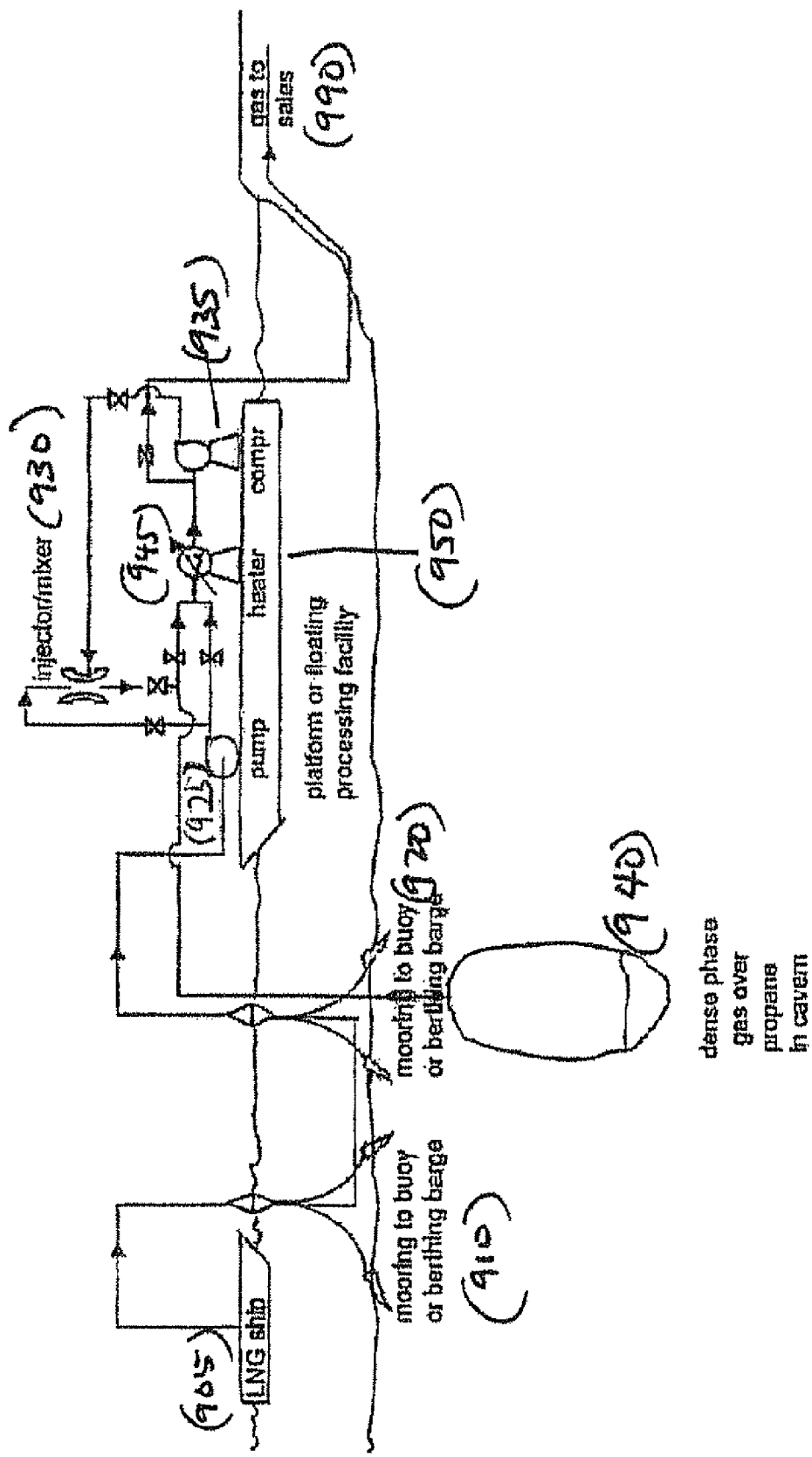
FIG. 9 shows an apparatus for unloading, gasifying, and storing LNG using an offshore cavern without a separate surge tank according to an alternate embodiment of the invention.
Figure 11:
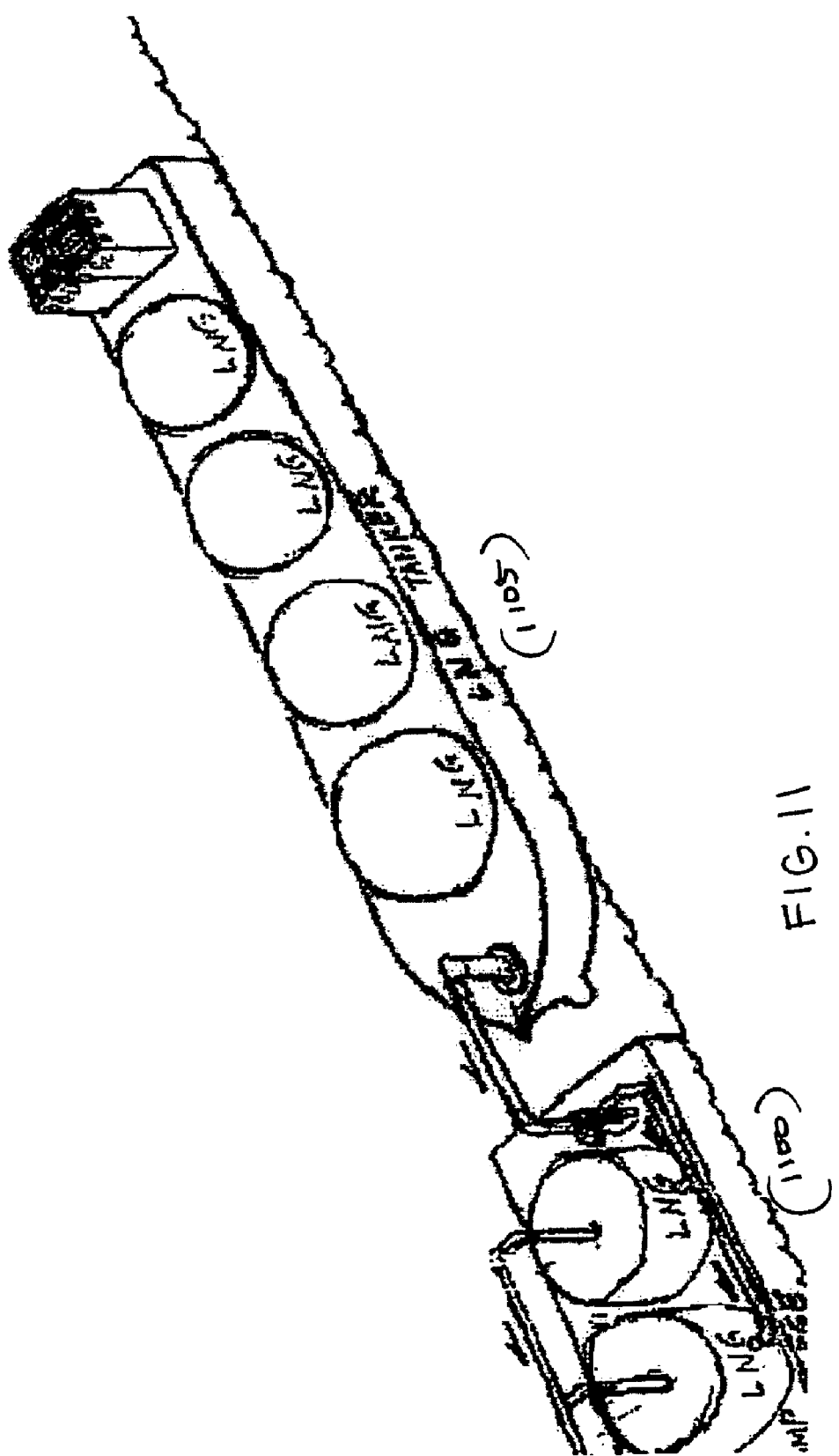
FIG. 11 shows an example of an LNG tanker unloading LNG onto a berthing facility according to an alternate embodiment of the invention.

FIG. 11 shows an LNG tanker 1105 moored in tandem to a berthing barge 1110 offshore. Use of an additional and separate surge tank and floating platform may or may not be included in the various berthing facility embodiments. As shown in FIG. 9, the NG tanker 905 is moored offshore to multiple buoys/berthing barges 910, 920 to support insulated pipelines for NG transfer to a platform or floating processing facility 950 without a surge tank. Pump 925 then transfers the NG into an offshore underwater salt cavern 940. In FIG. 9, dense phase equipment 930 is used, but in other embodiments, it may be excluded. When desired, the NG is removed from the offshore underwater salt cavern 940 and carried onshore by existing offshore lines 990 for distribution. Optionally, the NG may pass through a heater 945 and compressor 935 before distribution.

When gas is stored in a salt cavern it can be difficult to regulate the flow out of the cavern. When the gas is stored under a high pressure, the gas can be withdrawn quickly. However, when the gas pressure in the cavern is reduced, it is much harder to withdraw the gas quickly.

In preferred embodiments, the NG is directed into a prepared gas storage cavern formed from a salt dome at high pressure, or is forced into the storage cavern by causing it to displace propane to a second cavern, which in turn displaces salt water to a storage reservoir.

Figure 4:
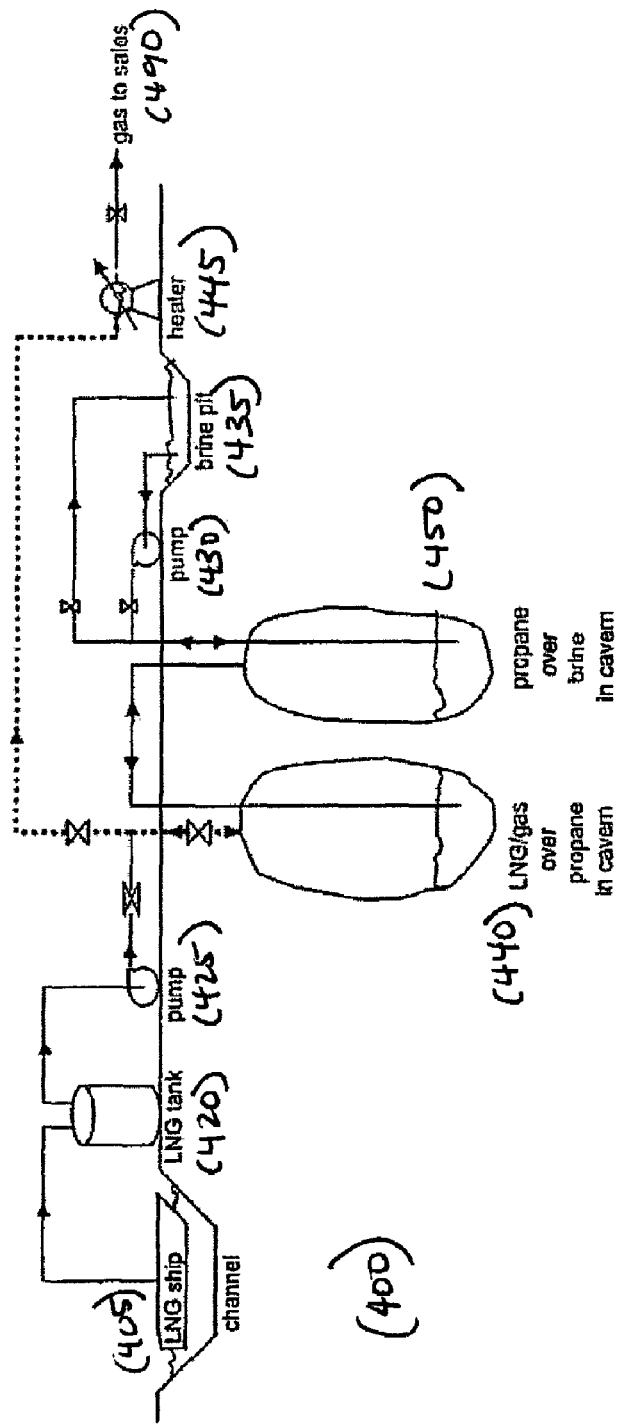
FIG. 4 shows an apparatus for unloading, gasifying, and storing LNG using a series of caverns to control LNG pressure according to an embodiment of the invention.

Accordingly, a further embodiment 400 utilizes both a first salt cavern 440 and second salt cavern 450 as depicted in FIG. 4. The second cavern 450 is mostly filled with liquid propane. The remainder of the second cavern is filled with brine. An additional brine storage pool 435 is also utilized. The NG is pumped off the offshore NG tanker 405 into a temporary NG tankage 420 on shore, transferred via pump 425 into the first salt cavern 440. When the pressure in the first cavern 440 falls below a desired level, brine can be pumped from the brine pool 435 via pump 430 into the second cavern 450, thereby displacing a portion of the liquid propane, the liquid propane is evacuated through a piping system into the bottom of the first cavern 440, thereby raising the pressure of the NG in the first cavern to the desired level. When desired, the NG is pumped out of the first cavern, heated into gaseous form by heater 445 and distributed for sale by pipeline 490.

The process can also be reversed. NG can be introduced into the first cavern 440 for storage, the introduction displacing some of the liquid propane from the first cavern 440 into the second cavern 450, thereby displacing brine from the second cavern. The propane and/or the brine can be displaced by pressure alone, or in another embodiment, the propane and/or the brine can be pumped.

While the above embodiments use either one or two caverns, there is no limit to the number of caverns that may be used. Alternate embodiments utilize other storage structures such as depleted gas reservoirs or man made storage facilities. If depleted reservoirs are used, multiple piping systems may be used such that the reservoirs are uniformly filled.

Figure 8:
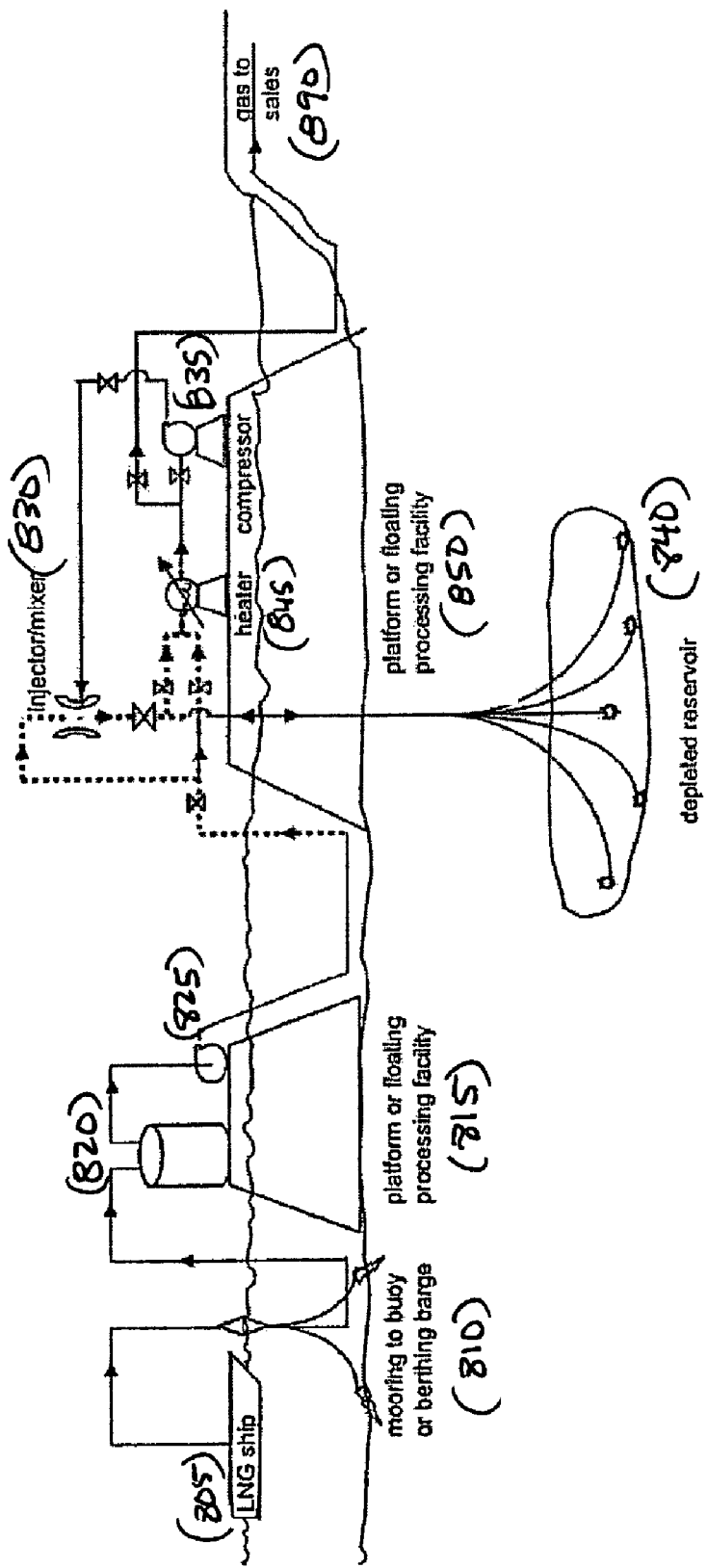
FIG. 8 shows an apparatus for unloading, gasifying, and storing LNG using a depleted reservoir with a separate surge tank according to an embodiment of the invention.

As shown in FIG. 8, a preferred embodiment includes offloading and storage in a depleted reservoir offshore. The NG tanker 805 is moored to buoy or berthing barge 810 while the NG is pumped through insulated pipes into a surge tank 820 on a platform or floating processing facility 815. The NG is then transferred by pump 825 via uninsulated pipes into an offshore underwater depleted reservoir 840. Dense phase equipment 830 is located on a platform or floating processing facility 850. When desired, the NG is pumped out of the offshore underwater depleted reservoir 840 and then carried onshore in an insulated pipeline for distribution 890. Optionally, the NG may pass through a heater 845 and compressor 835 before distribution.

Figure 10:
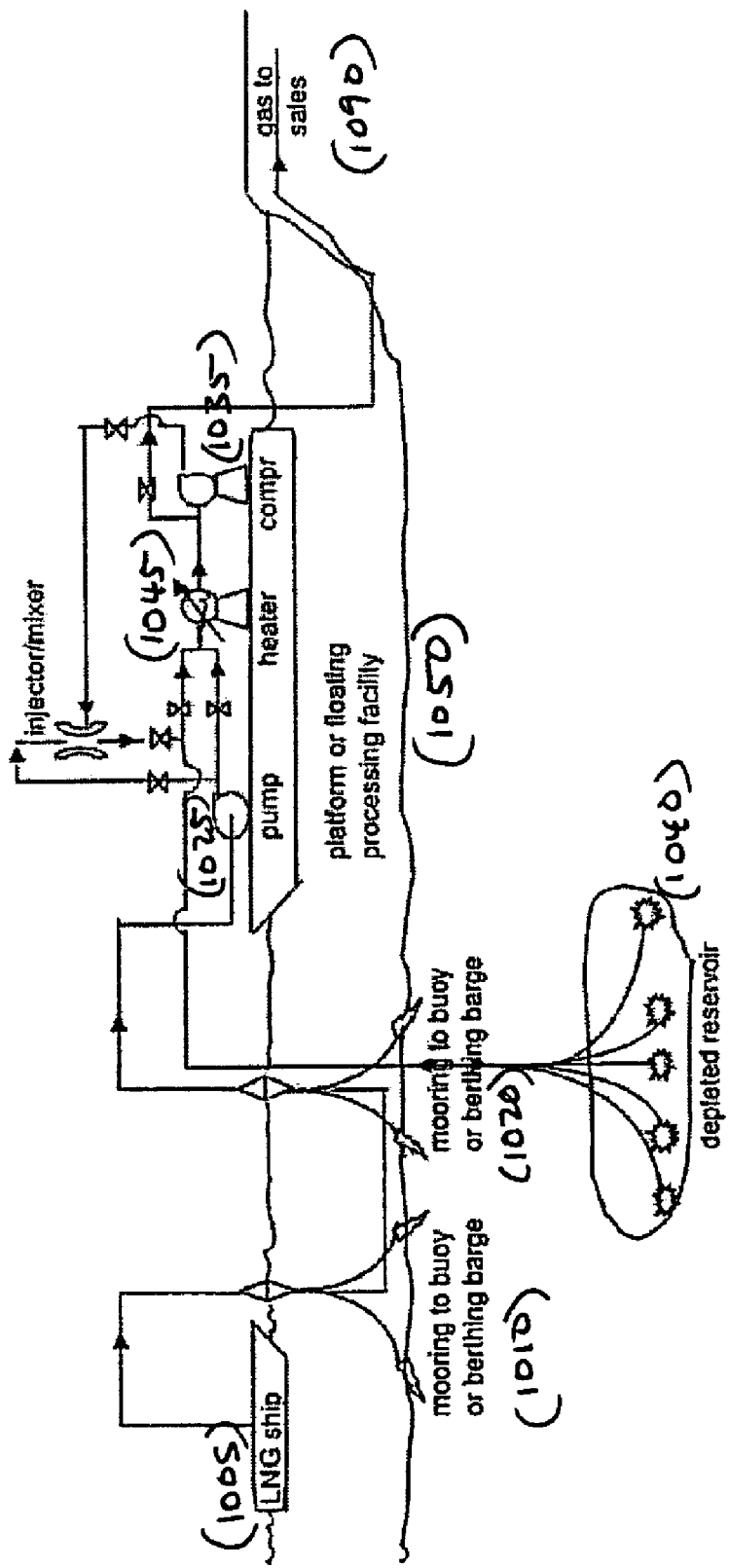
FIG. 10 shows an apparatus for unloading, gasifying, and storing LNG using an offshore depleted reservoir without a separate surge tank.

The separate temporary tankage may or may not be included in the various embodiments of berthing facilities. As shown in FIG. 10, the NG tanker 1005 is moored offshore to multiple buoys/berthing barges 1010, 1020 to support insulated pipelines for NG transfer to a platform or floating processing facility 1050. Pump 1025 then transfers the NG into an offshore underwater depleted reservoir 1040. In FIG. 10, dense phase equipment is used, but in other embodiments may be excluded. When desired, the NG is removed from the offshore underwater depleted reservoir 1040 and carried onshore by existing offshore lines 1090 for distribution. Optionally, the NG may pass through a heater 1045 and compressor 1035 before distribution.

In a further embodiment of the invention, NG is unloaded into the salt cavern or the propane gas pod and subsequently regasified by boil-off and/or surface reheating and/or transfer to further caverns, enhancing storage volume and control of the regasification process.

Figure 12:
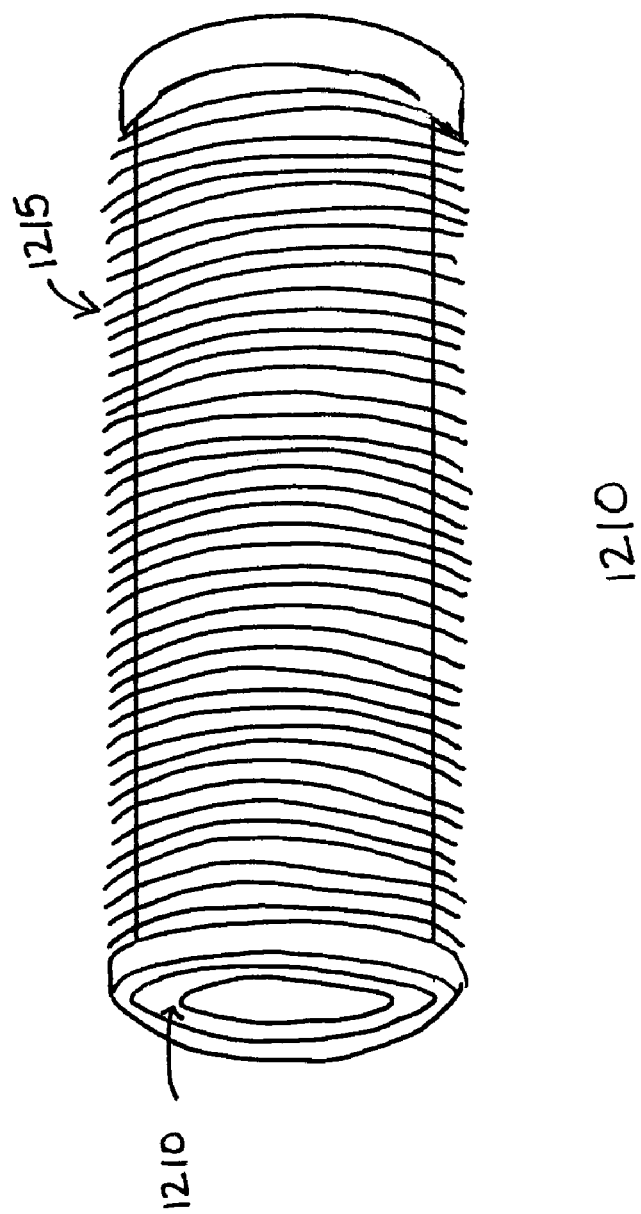
FIG. 12 shows a CNG container of one embodiment of the invention.

FIG. 12 shows an embodiment of a container 1210 for storing CNG on a tanker. Preferably one or more of the containers 1210 are located on a berthing facility, more preferably on a berthing facility receiving the tanker, and more preferably on both the tanker and the berthing facility. The depicted cylindrical container 1210 preferably holds 400-800 M ft.sup.3 of natural gas on one tanker. Preferably, the container 1210 is a hoop wrapped 1215 composite cylinder. The cylinder liner may be steel or other suitable material that retains its strength at the lowest transportation temperatures to be maintained during transportation or during unloading of the CNG. The composite wrapping 1215 or filaments may comprise carbon, graphite or fiber glass, with a bonding material of epoxy or other resin.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention.

The invention claimed is:

1. A berthing facility for loading or unloading a tanker of natural or hydrocarbon-containing fluid comprising:
   a facility for docking the tanker; and
   a floating or fixed platform connected to a docked tanker by
      a piping system wherein said piping system comprises;
      a regasification system for gasifying the natural or hydrocarbon-containing fluid, wherein the regasification system comprises piping wrapped around one or more portions of the berthing facility to facilitate warming of the natural or hydrocarbon-containing fluid; and
      the piping is a jacketed pipe with an inner portion for containing the natural or hydrocarbon-containing fluid and an outer portion that contains a hydrocarbon fluid.

2. The berthing facility of claim 1, wherein the piping system further comprises one or more pumps located on the tanker or on the platform.

3. The berthing facility of claim 2, wherein the one or more pumps comprises a plurality of pumps that are connected in series or in parallel.

4. The berthing facility of claim 1, wherein the natural or hydrocarbon-containing fluid to be loaded onto or unloaded from the tanker is dense-phase natural gas.

5. The berthing facility of claim 4, wherein the natural gas is at a temperature from minus 20° C. to minus 80° C. and at a pressure from 500 to 5,000 psig.

6. The berthing facility of claim 1 wherein the natural or hydrocarbon-containing fluid to be unloaded from the tanker is a liquid.

7. The berthing facility of claim 1, wherein the piping is wrapped around the platform and is at least partially submerged.

8. The berthing facility of claim 1, further comprising a fluid storage facility.

9. The berthing facility of claim 8, wherein the fluid storage facility comprises one or more underwater salt caverns or depleted reservoirs.

10. The berthing facility of claim 7, wherein the piping is wrapped in a coiled spiral configuration.

11. The berthing facility of claim 1, wherein the natural or hydrocarbon-containing fluid in the tanker is selected from the group consisting of liquid natural gas, dense-phase natural gas, compressed natural gas, liquid petroleum gas, dense-phase petroleum gas, compressed petroleum gas, helium, hydrogen, methane, butane, nitrogen hexane, pentane, gasoline and combinations thereof.

12. The berthing facility of claim 1, wherein the jacketed-pipe system is also a safety system that provides overpressure relief.

13. The berthing facility of claim 8, wherein the fluid storage facility contains a buffer layer between the natural or hydrocarbon-containing fluid and the water within the fluid storage facility.

14. The berthing facility of claim 13, wherein the buffer layer is comprised of liquid, gaseous or dense-phase ethane, methane, propane, carbon dioxide, nitrogen or combinations thereof.

15. The berthing facility of claim 1, further comprising a safety system.

16. The berthing facility of claim 15, wherein the safety system comprises an emergency alarm or fire preventing or fighting systems, or an escape module.

17. A berthing station for loading or unloading a tanker of natural or hydrocarbon-containing fluid comprising:
    a facility for docking the tanker and loading or unloading the natural or hydrocarbon-containing fluid;
    a piping system that connects a docked tanker to the facility; and
    a regasification system comprising piping of the piping system wrapped around one or more portions of the berthing station to facilitate warming of the natural or hydrocarbon-containing fluid, wherein the piping is a jacketed pipe with an inner portion for containing the natural or hydrocarbon-containing fluid and an outer portion that contains a hydrocarbon fluid.

18. The berthing station of claim 17, wherein the natural or hydrocarbon-containing fluid in the tanker is natural gas in liquid or dense phase form.

19. The berthing station of claim 18, wherein the natural gas is at a temperature from minus 20° C. to minus 80° C. and at a pressure from 500 to 5,000 psig.

20. The berthing station of claim 17, further comprising one or more containers for storage of the natural or hydrocarbon-containing fluid.

21. The berthing station of claim 20, wherein the piping system connects the docked tanker to the one or more containers.

22. The berthing station of claim 20, wherein the one or more containers comprises an underwater cavern, an underwater reservoir, an underwater insulated container, an above-water insulated container, or a combination thereof.

23. The berthing station of claim 22, wherein the underwater cavern or underwater reservoir contains a pad between the natural or hydrocarbon-containing fluid and water within the one or more containers.

24. The berthing station of claim 23, wherein the pad comprises a layer of liquid or gaseous ethane, methane, propane, carbon dioxide, nitrogen or a combination thereof.

25. The berthing station of claim 17, wherein the piping is wrapped around one or more portions of the berthing station in a coiled spiral configuration.

26. The berthing station of claim 17, further comprising a seawater-exchange warmer, and a circulation pump.

27. The berthing station of claim 17, wherein the regasification system converts liquid natural or hydrocarbon-containing fluid to dense-phase natural or hydrocarbon-containing fluid.

28. The berthing station of claim 17, wherein the regasification system converts dense phase natural or hydrocarbon-containing fluid to compressed-natural or hydrocarbon-containing fluid.

29. The berthing station of claim 17, wherein the docked tanker contains dense-phase natural or hydrocarbon-containing fluid.

30. The berthing station of claim 29, wherein the dense-phase natural or hydrocarbon-containing fluid aboard the docked tanker is maintained in a plurality of carbon-fiber or glass-fiber, overwrapped containers.

31. The berthing station of claim 17, wherein a portion of the piping is buried in or attached to the sea floor and connected to a shore-side facility.

32. The berthing station of claim 17, wherein the natural or hydrocarbon-containing fluid in the tanker is selected from the group consisting of liquid natural gas, dense-phase natural gas, compressed natural gas, liquid petroleum gas, dense-phase petroleum gas, compressed petroleum gas, helium, hydrogen, methane, butane, nitrogen hexane, pentane, gasoline and combinations thereof.

33. A berthing station for loading or unloading a tanker of natural or hydrocarbon-containing fluid, comprising:
    a facility for docking the tanker and loading or unloading the natural or hydrocarbon-containing fluid;
    a piping system that connects the facility to a docked tanker, wherein at least a portion of said piping system comprises a jacketed pipe with an inner portion for containing the natural or hydrocarbon-containing fluid, an outer portion that contains a circulating hydrocarbon fluid; and
    a regasification system wherein at least a portion of the jacketed pipe is wrapped around the at least part of the station to facilitate warming of the natural or hydrocarbon-containing fluid.

34. The berthing station of claim 33, wherein the natural or hydrocarbon-containing fluid is at a temperature of from minus 100° C. to 0° C. or at a pressure of from 1,000 to 4,000 psig.

35. The berthing station of claim 34, further comprising one or more containers for holding the natural or hydrocarbon-containing fluid wherein said containers are comprised of a nickel-steel alloy overwrapped with carbon fibers, glass fibers, or both, wherein said fibers are bonded together with a suitable resin, and said containers are capable of repeatedly withstanding temperatures from minus 100° C. to 0° C. and pressures from 1,000 to 4,000 psig.

36. The berthing station of claim 33, wherein the natural or hydrocarbon-containing fluid in the tanker is selected from the group consisting of liquid natural gas, dense-phase natural gas, compressed natural gas, liquid petroleum gas, dense-phase petroleum gas, compressed petroleum gas, helium, hydrogen, methane, butane, nitrogen hexane, pentane, gasoline and combinations thereof.

37. The berthing station of claim 36, wherein the natural gas is natural gas in liquid or dense-phase form.

38. The berthing station of claim 37, wherein the natural gas in at a temperature from minus 20° C. to minus 80° C. and at a pressure from 500 to 5,000 psig.

39. A berthing station for loading or unloading a tanker of natural or hydrocarbon-containing fluid, comprising:
    a facility for docking the tanker and loading or unloading the natural or hydrocarbon-containing fluid;
    a piping system that connects the facility to a docked tanker; and
    a regasification system wherein at least a portion of piping of the piping system is wrapped around the at least part of the station in a coiled spiral configuration to facilitate warming of the-natural or hydrocarbon-containing fluid.

40. The berthing station of claim 39, wherein at least a portion of piping of the piping system is jacketed with a warming fluid.

41. The berthing station of claim 40, wherein the warming fluid is comprised of liquid, dense-phase or gaseous ethane, methane, propane, carbon dioxide, nitrogen or combinations thereof.

42. The berthing station of claim 39, wherein the natural or hydrocarbon-containing fluid in the tanker is selected from the group consisting of liquid natural gas, dense-phase natural gas, compressed natural gas, liquid petroleum gas, dense-phase petroleum gas, compressed petroleum gas, helium, hydrogen, methane, butane, nitrogen hexane, pentane, gasoline and combinations thereof.

43. The berthing station of claim 39, wherein the natural or hydrocarbon-containing fluid in the tanker is natural gas in liquid or dense-phase form.

44. The berthing station of claim 43, wherein the natural gas in at a temperature from minus 20° C. to minus 80° C. and at a pressure from 500 to 5,000 psig.

* * * * *